(12) United States Patent
Sessions

(10) Patent No.: US 11,654,816 B2
(45) Date of Patent: May 23, 2023

(54) MULTIPLE USE ACTUATION SYSTEM FOR VERTICAL RAIL LIFTGATE

(71) Applicant: Liftwave, Inc., Somerville, MA (US)

(72) Inventor: Blake Sessions, Boston, MA (US)

(73) Assignee: Liftwave, Inc., Somerville, MA (US)

( * ) Notice: Subject to any disclaimer, the term of this patent is extended or adjusted under 35 U.S.C. 154(b) by 21 days.

(21) Appl. No.: 17/442,857

(22) PCT Filed: Mar. 30, 2020

(86) PCT No.: PCT/US2020/025808
§ 371 (c)(1),
(2) Date: Sep. 24, 2021

(87) PCT Pub. No.: WO2020/198748
PCT Pub. Date: Oct. 1, 2020

(65) Prior Publication Data
US 2022/0185164 A1    Jun. 16, 2022

Related U.S. Application Data

(60) Provisional application No. 62/825,307, filed on Mar. 28, 2019.

(51) Int. Cl.
*B60P 1/44* (2006.01)
(52) U.S. Cl.
CPC ........... *B60P 1/4421* (2013.01); *B60P 1/4471* (2013.01); *B60P 1/4478* (2013.01)
(58) Field of Classification Search
CPC .............................. B60P 1/4421; B60P 1/4471

USPC ......................................................... 414/545
See application file for complete search history.

(56) References Cited

U.S. PATENT DOCUMENTS

| | | | | |
|---|---|---|---|---|
| 3,831,788 A | * | 8/1974 | Erlinder | B60P 1/4421 414/545 |
| RE31,157 E | * | 2/1983 | Perkins | B60P 1/4421 414/545 |
| 4,408,948 A | * | 10/1983 | Robinson | B60P 1/4421 414/545 |
| 4,563,121 A | * | 1/1986 | Drews | B60P 1/4421 414/545 |
| 4,836,736 A | | 6/1989 | Neagu et al. | |
| 5,263,808 A | * | 11/1993 | Kent | B60P 1/4421 414/812 |
| 5,513,943 A | | 5/1996 | Lugash et al. | |
| 7,491,026 B2 | | 2/2009 | Hooker et al. | |

(Continued)

FOREIGN PATENT DOCUMENTS

| | | | | |
|---|---|---|---|---|
| GB | 2032879 A | * | 5/1980 | ............ B60P 1/4421 |
| GB | 2125103 A | * | 2/1984 | ................ B60P 1/44 |
| GB | 2125365 A | * | 3/1984 | ................ B60P 1/44 |

OTHER PUBLICATIONS

PCT International Preliminary Report on Patentability in International Appln. No. PCT/US2020/02808, dated Oct. 7, 2021, 7 pages.

(Continued)

*Primary Examiner* — James Keenan
(74) *Attorney, Agent, or Firm* — Fish & Richardson P.C.

(57) ABSTRACT

The disclosure provides apparatuses, systems, and methods for enabling lift cylinders within rail-type liftgates to perform both lifting and closing motions.

12 Claims, 14 Drawing Sheets

(56) References Cited

U.S. PATENT DOCUMENTS 8,740,539 B2 6/2014 Ablabutyan
9,481,282 B2 11/2016 Walker et al.

OTHER PUBLICATIONS

PCT International Search Report and Written Opinion in International Appln. No. PCT/US2020/025808, dated Jun. 26, 2020, 8 pages.
MAXON Lift Corp., MAXON Maintenance Manual M-90-3, Rev. M, Oct. 2012.†
LDV, Inc., YouTube, Snap-on VersaFlex MT 45 Tool Truck—3—Lift Gate, available at: https://www.youtube.com/ watch?v=_6KG5ahr6vM, Apr. 13, 2015.†

\* cited by examiner
† cited by third party

MULTIPLE USE ACTUATION SYSTEM FOR VERTICAL RAIL LIFTGATE

CROSS REFERENCE TO RELATED APPLICATIONS

The present application is a National Stage Application under 35 U.S.C. § 371 and claims the benefit of International Application No. PCT/US2020/025808, filed Mar. 30, 2020, which claims priority to U.S. Provisional Application No. 62/825,307 filed Mar. 28, 2019, entitled "MULTIPLE USE ACTUATION SYSTEM FOR VERTICAL RAIL LIFTGATE," the entirety of which application is hereby incorporated herein by reference.

TECHNICAL FIELD

The present disclosure relates to the design of powered liftgates, which are truck-mounted platforms that raise and lower cargo from ground level to bed level on commercial vehicles.

BACKGROUND

Truck mounted liftgates come in many forms and sizes. A common design for heavy duty cargo lifting of 3,500 to 6,500 lbs utilizes two vertical sliding runners on the back of the trailer that connect to a platform. This platform can then travel vertically from ground level to the level of the trailer's bed, allowing operators to forgo the use of ramps and/or ladders and to easily raise and lower heavy loads. The platform folds open (flat) during use, and folds closed (vertical) when stowed for transport. Heavier duty models often have platforms weighing from 600 lbs to 1,100 lbs, requiring substantial power to open and close. For these models, in addition to the two main hydraulic cylinders that raise and lower the platform inside of the column, a third hydraulic cylinder is used to perform the folding/unfolding motion. This is known as the closer cylinder, and it must be powered through hydraulic hoses that run through an energy chain due to the cylinder's location on the moving runner.

SUMMARY

Various implementations of the present invention remove the necessity for the closing cylinder while maintaining the power of the opening/closing solution. While the use of a closer cylinder is simple from a design perspective, the additional cylinder and its fluid power delivery system constitute a substantial addition to the cost of production as well as to the maintenance requirements of the machine.

Various implementations provide smoother opening and closing action to platform without substantially adding to cost. This is done by eliminating the closing cylinder entirely and using higher quality lift cylinders (hydraulic or electric) with better control systems that perform both lift/lower and open/close actions.

This is done by manipulating the load paths that run through the liftgate. Typically, the lift cylinders are mounted to the column frame at their top rod-end and directly to the runners at their bottom rod-end, pulling directly on the runners and supporting them via pin locations near the bottom of the runners. The limits of travel are defined by the limits of the hydraulic cylinders themselves: Motion in the upward direction ceases when the piston head has bottomed out within the cylinder.

The closer cylinder is mounted within the runner, pinned at its top rod-end into the runner structure, and pinned at its bottom rod-end to a link that is torsionally coupled to the platform. Tension is provided from these two points, exerting a load on the closer link, which provides torsion through the platform's main support shaft. These loads are not active when the platform is extended and in use, because the platform is supported more directly by a chain.

Described herein are systems and methods of having the lift cylinders perform both actions for the liftgate. With the platform extended and supported by the frame, during lifting the load path travels from the top column through the lift cylinder, through a sliding body that resides in the runner, through a transfer link that connects to the closer cylinder link, into the closer link, and finally into the platform with a substantial closing torque. Two circumstances are worth considering here, as it seems that the process of lifting the platform by its closer cylinder link pin would cause it to immediately fold.

In the first circumstance, the platform is empty. Because the lift cylinders are mounted to the columns and not to the runners, they don't have the ability to develop the reaction force that a closer cylinder would, so as they contract, the entire platform rises instead of folding closed as the ~600 lbf of load per cylinder that is required to lift an empty platform is not sufficient to provide the torque needed to close the platform (which needs about 7,000 lbf.)

In the second circumstance, the platform is loaded with cargo. In this situation the lift cylinders can indeed develop enough tensile load to close the platform (total cylinder loads of 3,500-5,000 lbf each are common) but the cargo itself provides a counter-torque that far exceeds the torque exerted on the platform by the load on the closing link, thus keeping the platform stably open.

In order to close the platform, the runners are raised to their maximum vertical position while the platform is empty. The runners hit a vertical hard stop so that the cylinders can develop higher loads with an empty platform, and the sliding body within the runners begins to translate vertically. Instead of the runners moving and the sliding body, connecting link, closing link, and platform remaining static in the runner frame, the latter components all move upwards while the runner remains in place.

The location of the platform latch has to change in order to enable this design to work. The latch moves from being a column-mounted feature to a runner-mounted feature so that it can maintain a closed platform throughout the vertical range of travel in order to enable dock loading. The latch spring-loads closed so that it is not possible for an operator to forget to close it. Furthermore, the latch has a retaining pin location in the platform so that it cannot open if the platform is pressing on the latch. This prevents the platform from falling open should an operator try to open the latch while the runners are not at their highest position.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawing primarily is for illustrative purposes and is not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawing, like reference characters generally refer to like features (e.g., functionally similar and/or structurally similar elements).

The features and advantages of the inventive subject matter disclosed herein will become more apparent from the detailed description set forth below when taken in conjunction with the drawings.

DETAILED DESCRIPTION

Following below are more detailed descriptions of various concepts related to, and exemplary embodiments of, a multiple use actuation system for vertical rail liftgates.

Figure 1:
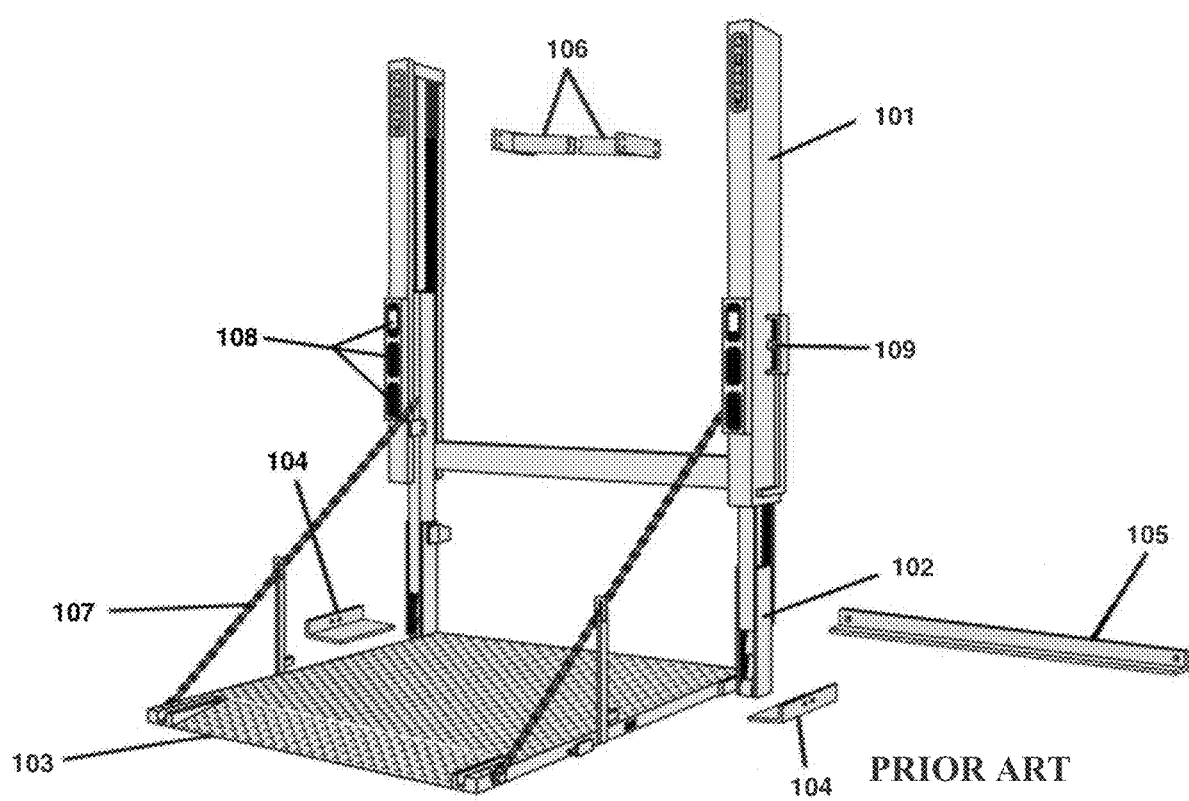
FIG. 1 shows the major elements of a modern rail-type liftgate.

FIG. 1 shows the major components of a liftgate. A pair of columns 101 are welded to the back end of the trailer. Runners 102 slide vertically within the columns and mount to the platform 103, which is supported when fully open by a pair of chains 107. Various brackets 104-106 are used for shipping. Lights 108 are powered by the truck's cab to indicate braking and turning. Switches 109 control the liftgate functions of raising/lowering and opening/closing.

Figure 2:
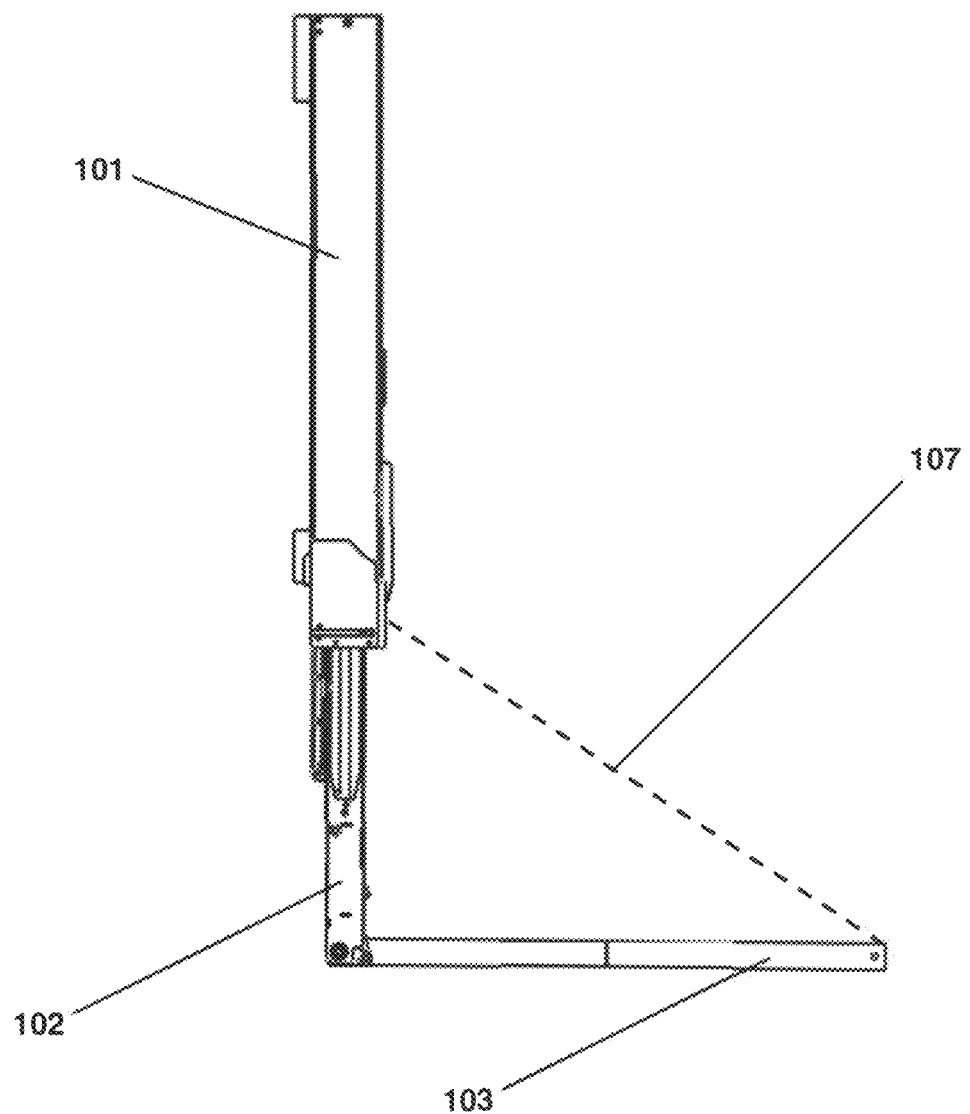
FIG. 2 shows a side view of a rail-type liftgate.

FIG. 2 presents a side view of the rail-type liftgate for clarity.

Figure 3:
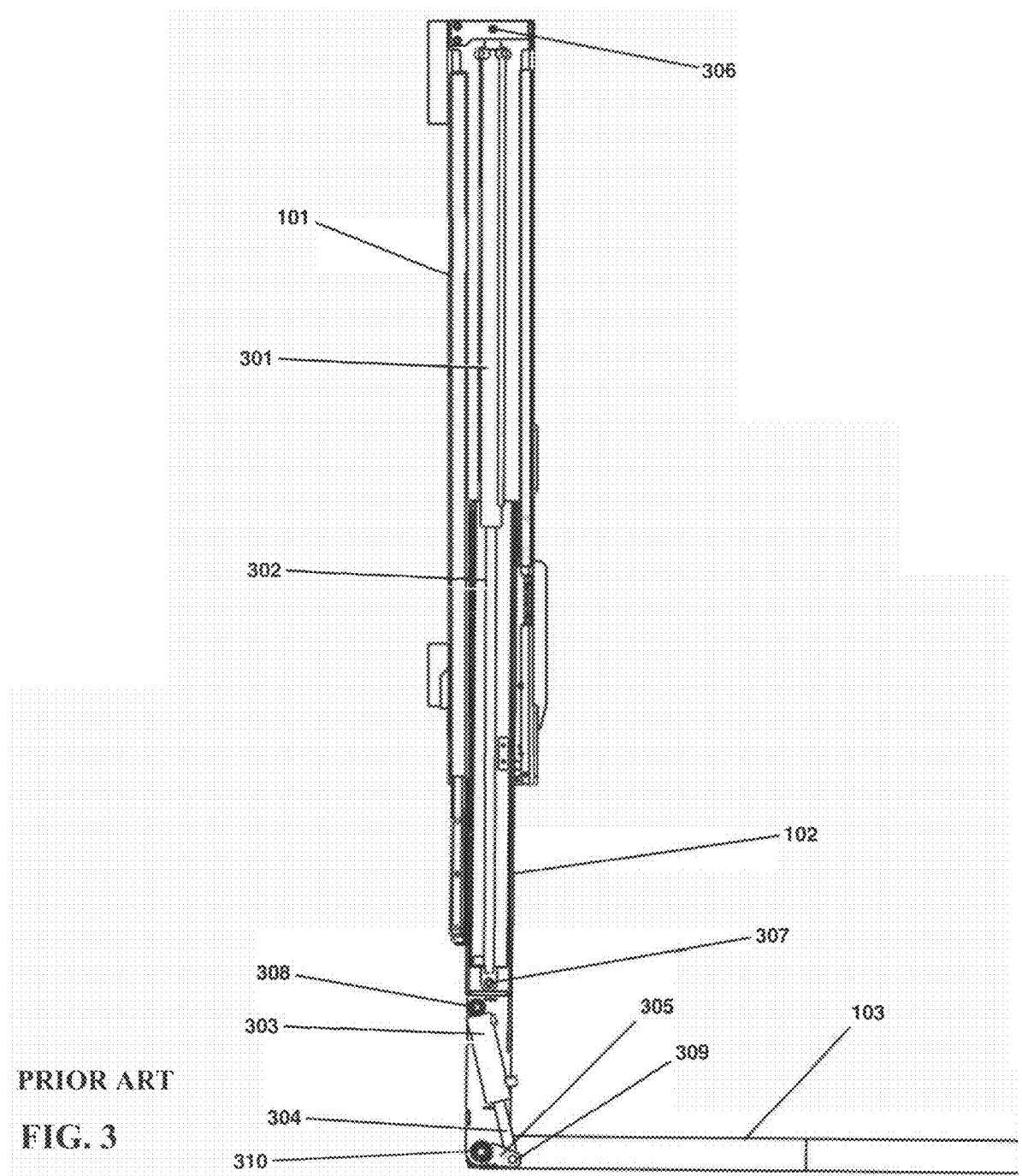
FIG. 3 depicts the major actuation elements of the current state of the art.

In FIG. 3, the standard arrangement of hydraulics is presented. Lift cylinder body 301 is pinned 306 at the top of the column. The lift cylinder rod 302 is pinned at its rod-end 307 to the runner 102. The lift cylinder 301 acts between the column 101 and the runner 102 to lift the runners and the platform 103 together. The closer cylinder body 303 is pinned to the runner 102 at pin 308. The closer cylinder rod 304 is pinned to the platform closer link 305 with pin 309. Main platform pin 310 connects the platform closer link 305 to the platform 103.

Figure 4:
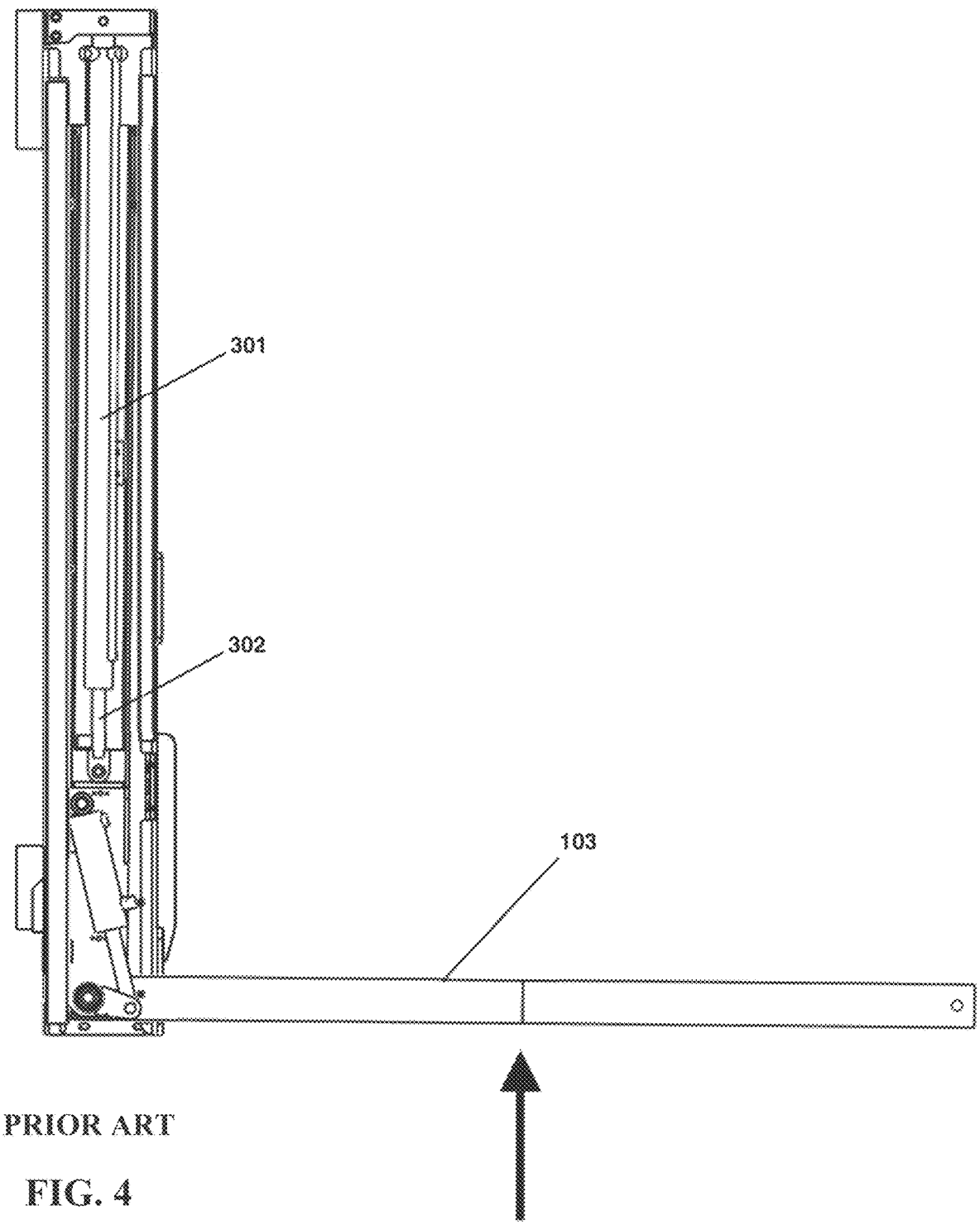
FIG. 4 shows the lifting motion of the liftgate.

FIG. 4 shows the lifting motion of the open platform 103, actuated by the lift cylinder 301,302, which acts in tension.

Figure 5:
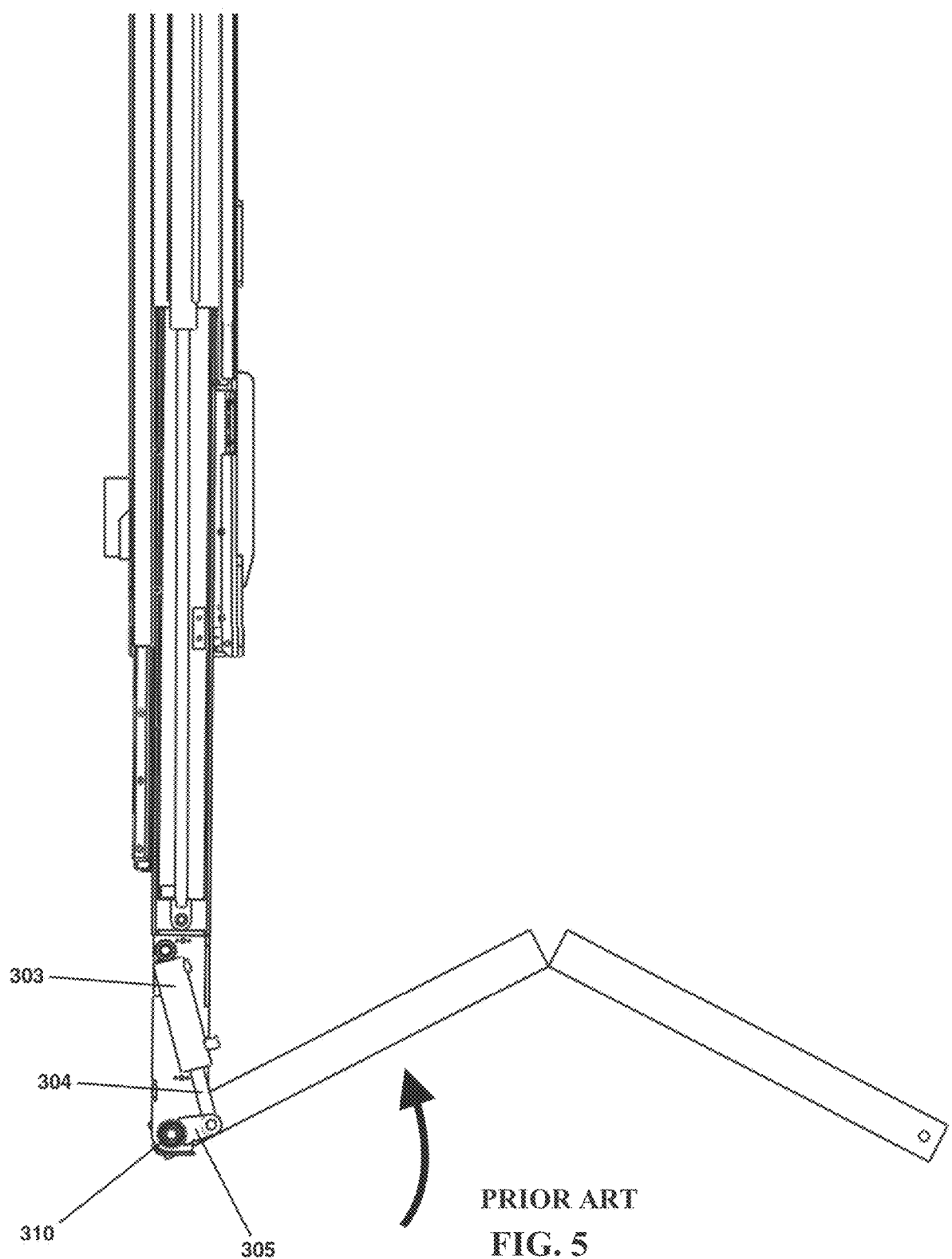
FIG. 5 illustrates the platform closing motion.

FIG. 5 shows the closing motion of the open platform 103, actuated by the closer cylinder 303,304, which acts in tension to close the platform 103. Platform pin 310 transfers torsion from the platform closer link 305 to the platform 103.

Figure 6:
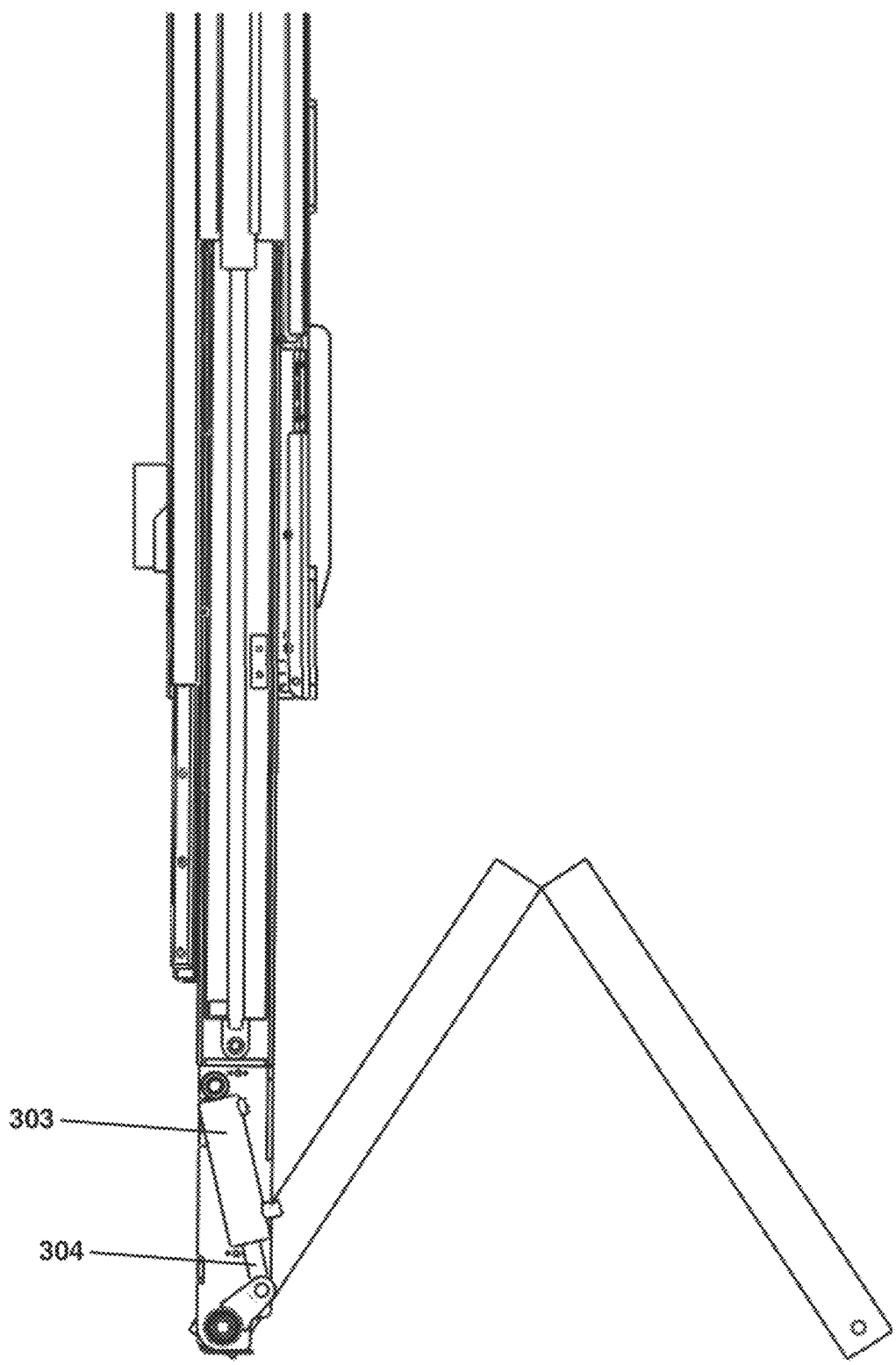
FIG. 6 shows the liftgate platform as it closes as per the current state of the art.

FIG. 6 shows a platform in a partially closed position.

Figure 7:
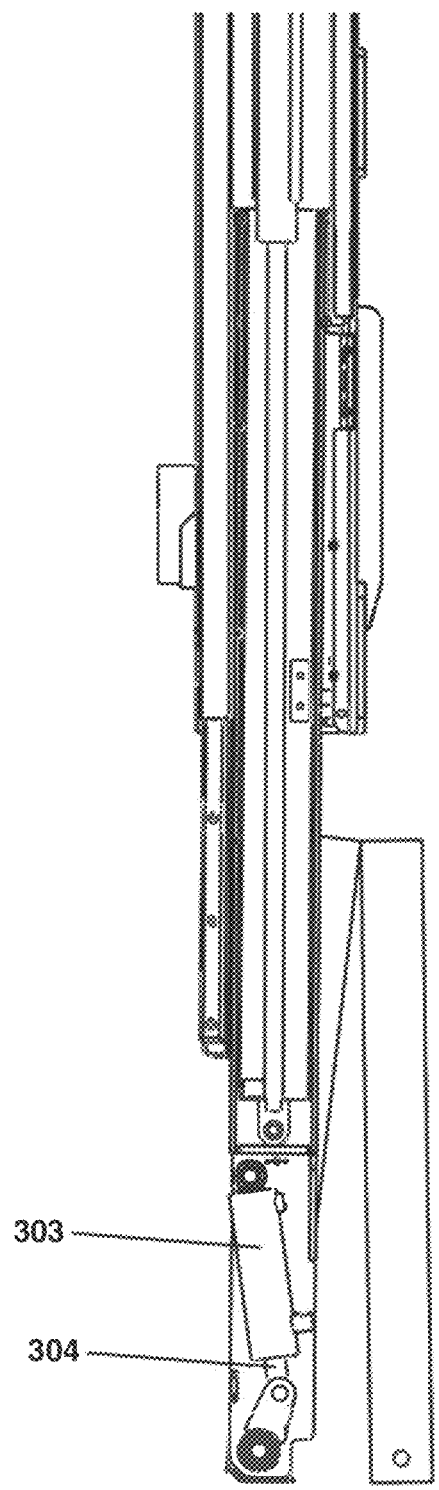
FIG. 7 shows the closed liftgate platform.

FIG. 7 shows a fully closed platform.

Figure 8:
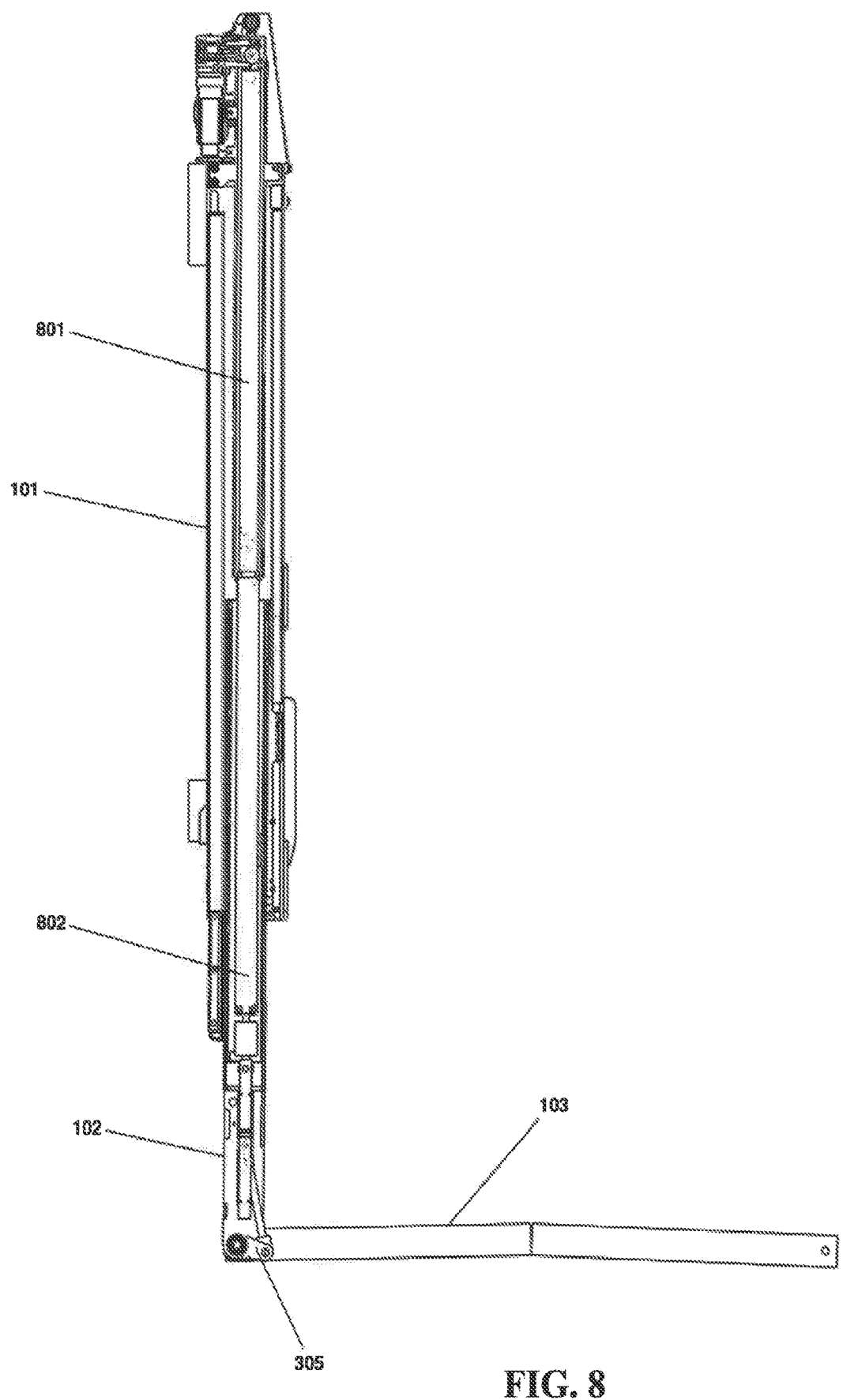
FIG. 8 shows the major actuation elements of the invention.

FIG. 8 presents the major actuation elements of the invention, consisting of a single actuator housing 801 and a single actuator rod 802 per side of the machine.

Figure 9:
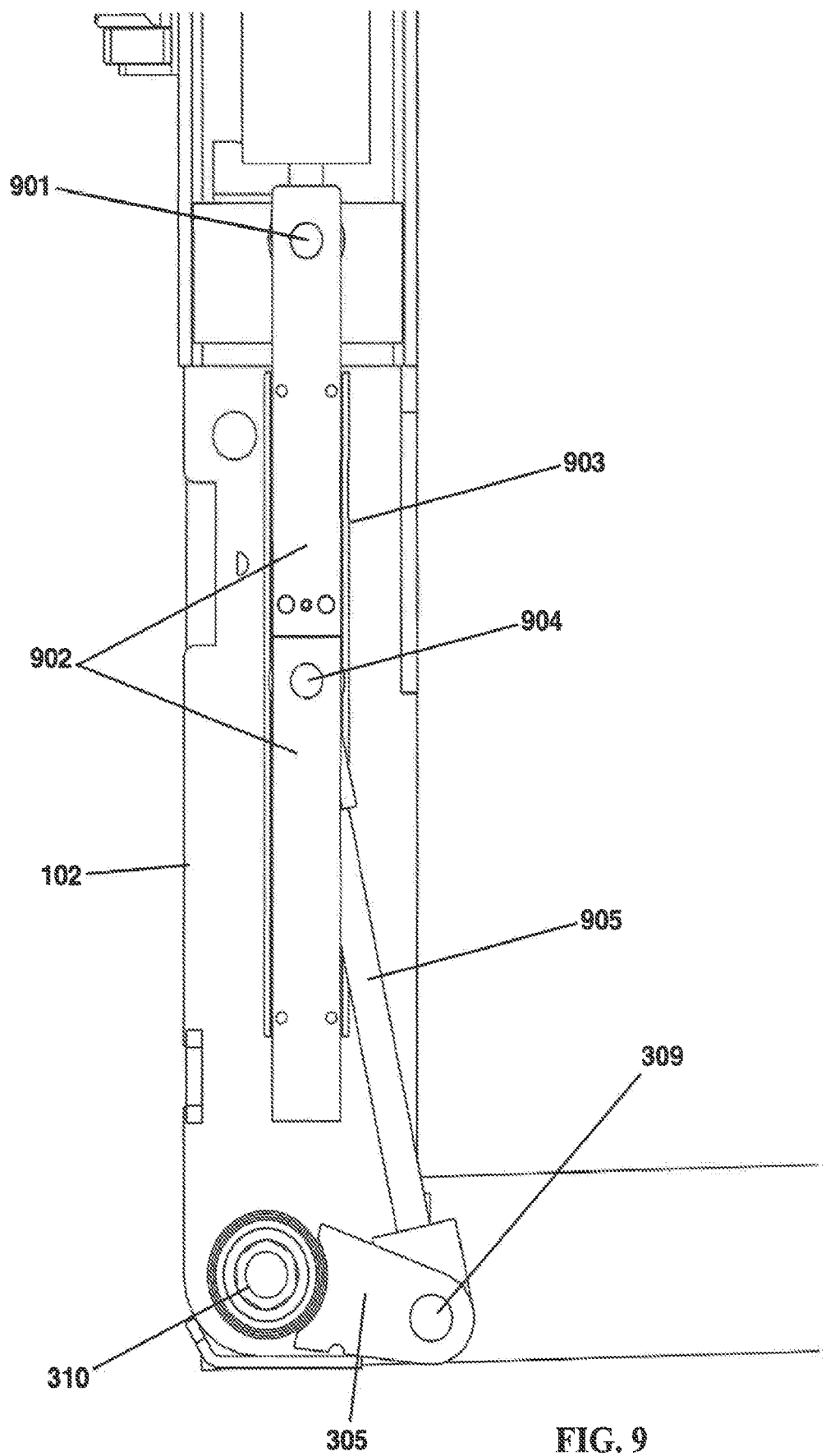
FIG. 9 presents a close-up of the closing area at the end of the runner.

FIG. 9 presents a detailed view of the connections near the bottom of the runner. Instead of being pinned directly to the runner 102, the actuator rod 802 is pinned to closer sliding body 902, which is linearly coupled to the closer guide rail 903, constraining the motion of closer sliding body 902 to be vertical as presented in these figures. The closer guide rail 903 is rigidly affixed to the runner 102. A transfer link 905 is pinned at one end 904 to the closer sliding body 902 and pinned at the other end to the platform closer link 305 using pin 309. The main platform pin 310 remains unchanged. Both sets of columns and runners have this set of hardware.

Figure 10:
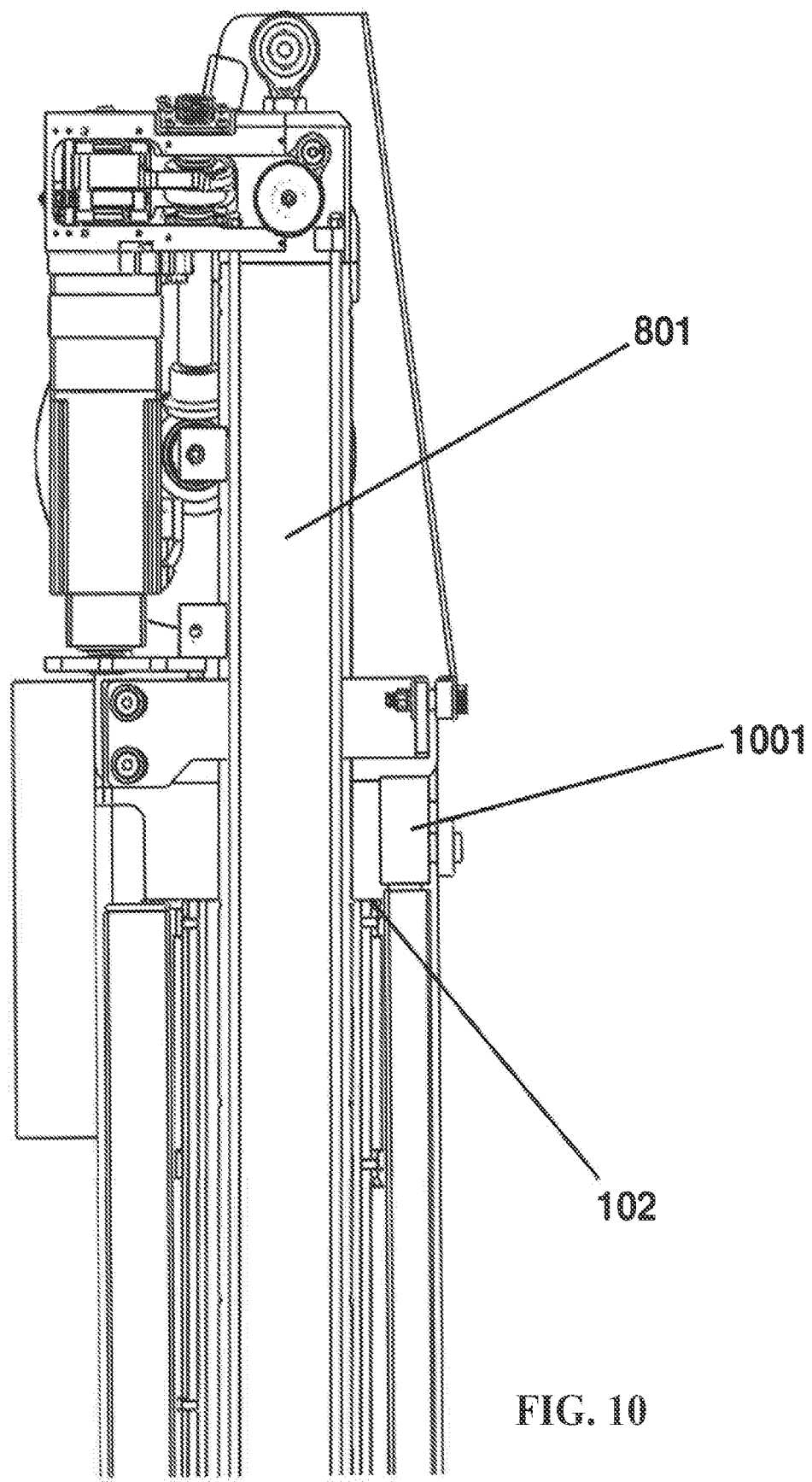
FIG. 10 shows the top end of the column while the platform is at bed level with the trailer.

FIG. 10 shows the top of the column while the platform is open and at bed level. The runner 102 has not yet contacted the hard stop 1001, which is rigidly affixed to the column 101.

Figure 11:
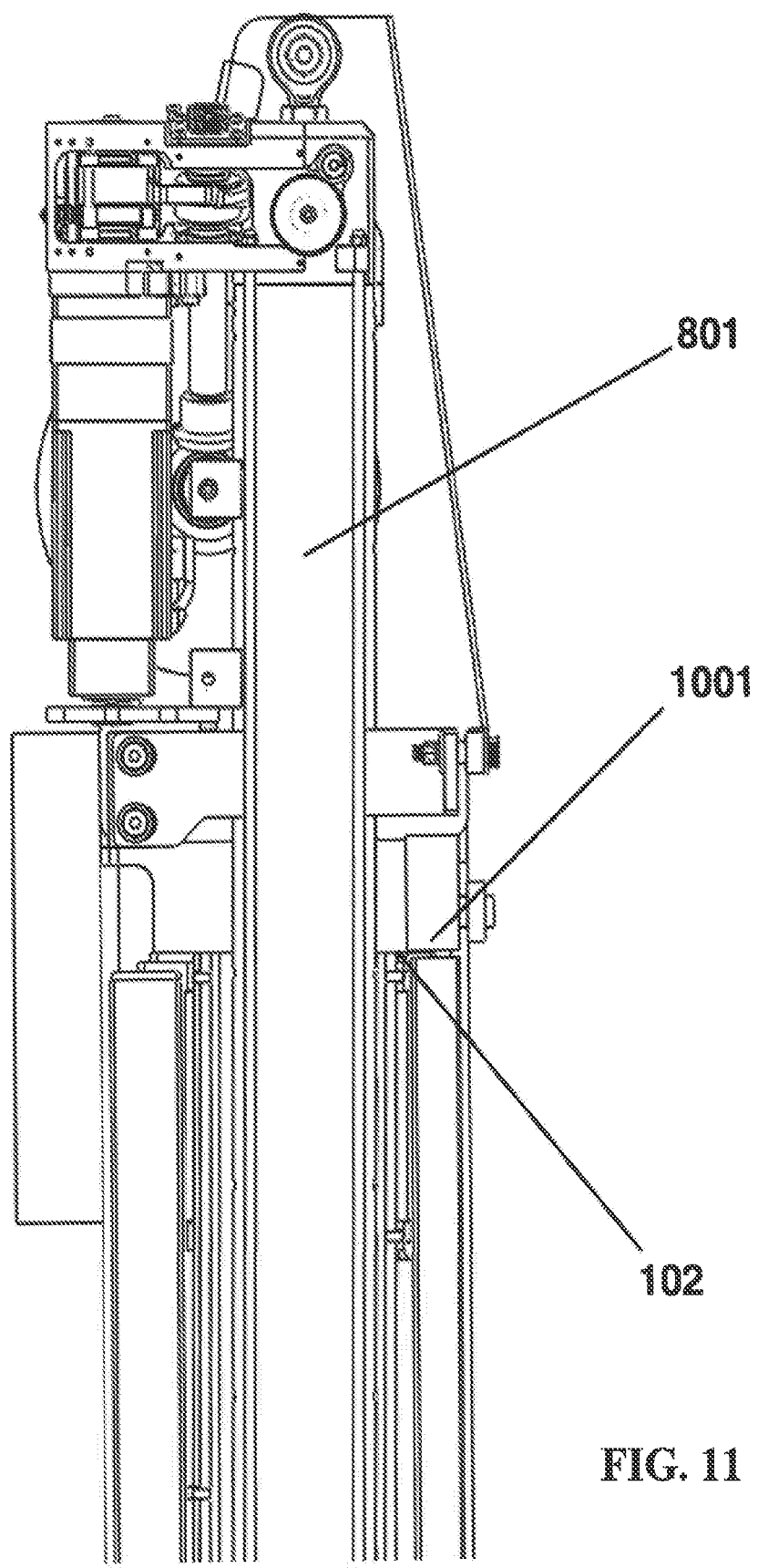
FIG. 11 shows the top end of the column while the platform is raised above the bed level of the trailer for closing the platform.

FIG. 11 shows the top of the column when the platform has been raised above bed level. The runner 102 has contacted the hard stop 1001 and how has the potential for a reaction force when pulling on the platform closer link 305.

Figure 12:
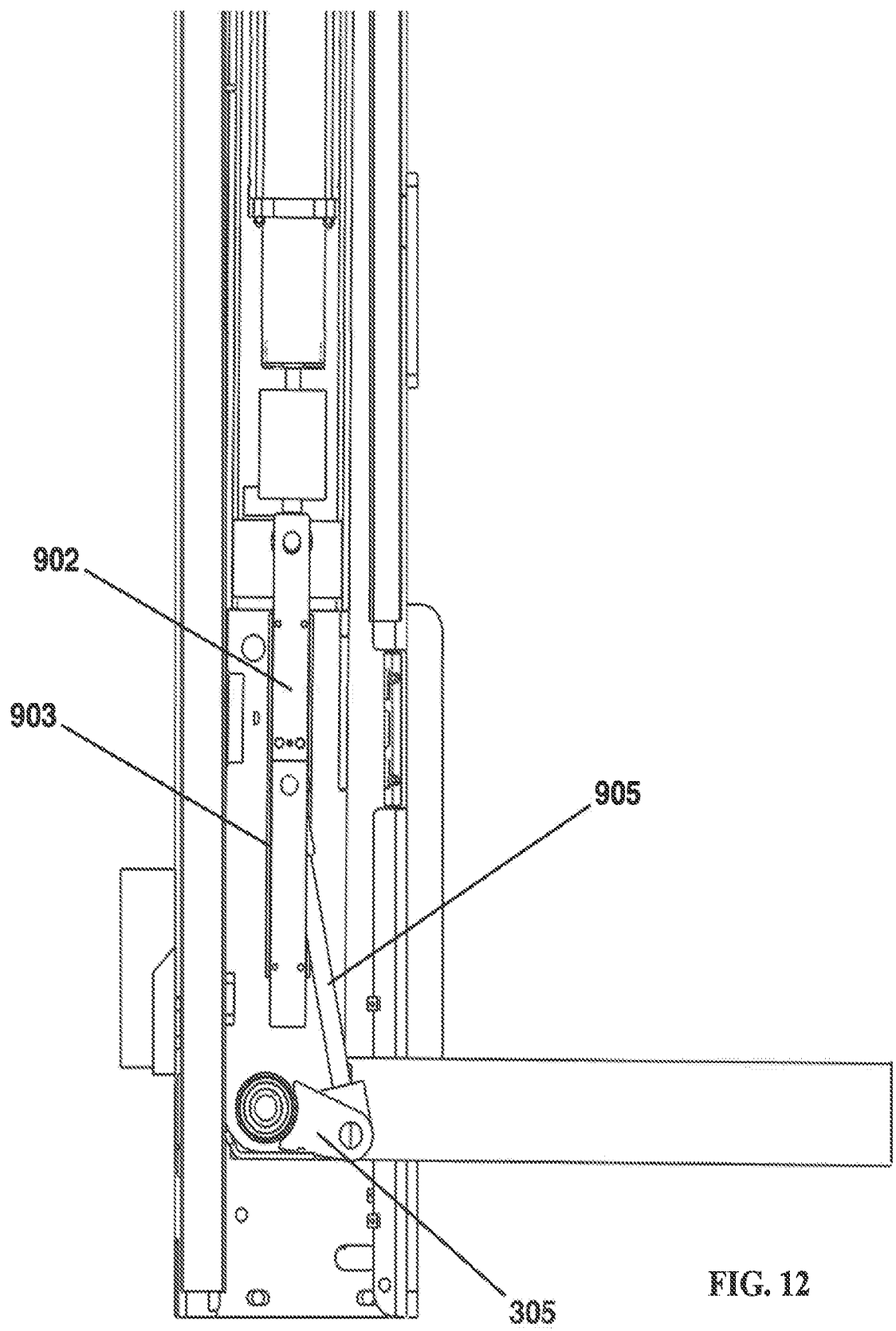
FIG. 12 presents a close-up of the closing area at the end of the runner with platform fully extended.
Figure 13:
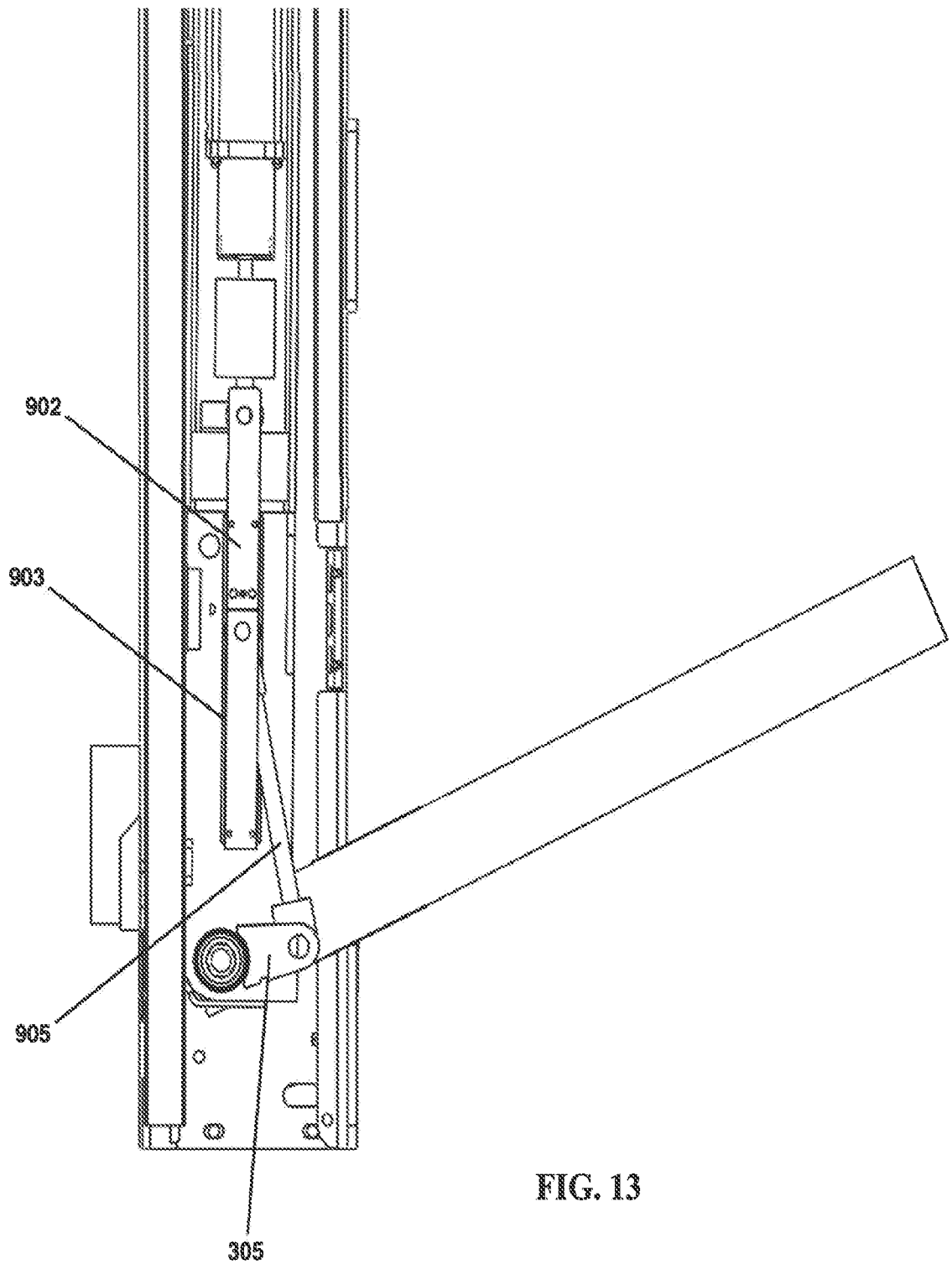
FIG. 13 presents a close-up of the closing area at the end of the runner with platform partially closed.
Figure 14:
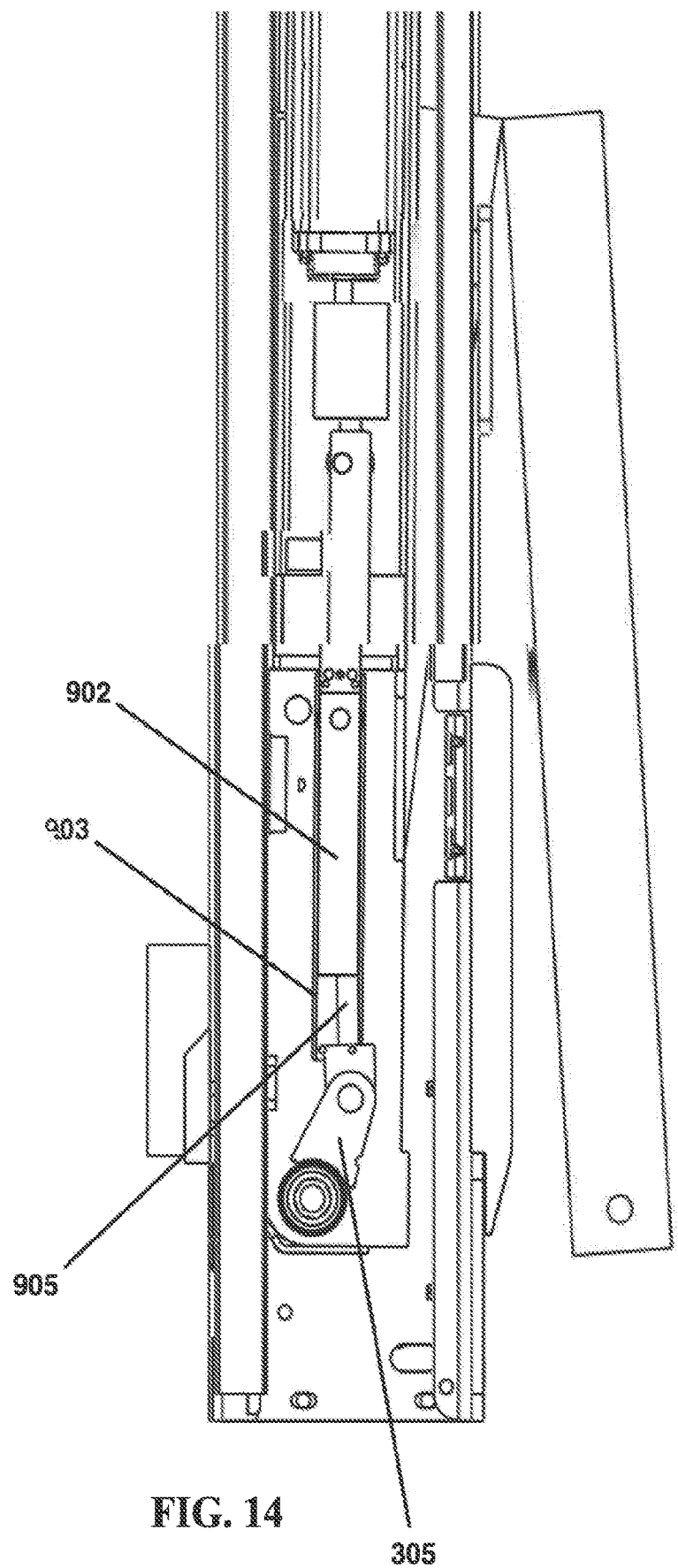
FIG. 14 presents a close-up of the closing area at the end of the runner with the platform fully closed.

FIGS. 12-14 show the platform closing motion. The lift cylinder 801, 802 develops full tension and passes that tension through the closer sliding body 902 and the transfer link 905 into the platform closer link 305. This torque causes the platform 103 to fold into its closed position.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of spring systems or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, describes techniques, or the like, this application controls.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A liftgate comprising:
   a frame;
   a runner at least partially nested within the frame, wherein the runner is configured to translate relative to the frame along a vertical axis;
   a platform coupled with a first end of the runner, wherein the platform is rotatable relative to the runner about an axis perpendicular to the vertical axis;
   a slider coupled to the runner and arranged at least partially within the frame, wherein the slider is configured to translate relative to the runner along the vertical axis;
   a transfer link connected between a first end of the slider and a closer link that is coupled to the platform, wherein the closer link is configured to rotate the platform as the slider is translated along the vertical axis;
   a mechanical stop coupled to the frame and configured to limit an upward translation of the runner to define an upper bound of travel of the runner; and
   a linear actuator connected to a second end of the slider to apply a force to the slider, wherein a first force required to translate the runner relative to the frame is less than a second force required to translate the slider relative to the runner, and wherein the linear actuator is configured to cause translation of the runner until the runner reaches the mechanical stop, and then translation of the slider relative to the runner and rotation of the platform.

2. The liftgate of claim 1, wherein translation of the slider rotates the closer link.

3. The liftgate of claim 1, wherein a range of motion of the linear actuator is greater than a range of motion of the runner.

4. The liftgate of claim 1, wherein the frame is mounted to a vehicle.

5. The liftgate of claim 1, wherein the linear actuator comprises a hydraulic cylinder.

6. The liftgate of claim 1, wherein the linear actuator comprises an electric cylinder.

7. The liftgate of claim 1, comprising:
   a second frame arranged parallel to the frame;
   a second runner at least partially nested within the second frame;
   a second slider coupled to the second runner and arranged at least partially within the second frame, wherein the second slider is configured to translate relative to the second runner along the vertical axis;
   a second transfer link connected between a first end of the second slider and a second closer link that is coupled to the platform, wherein the second closer link is configured to rotate the platform as the slider is translated along the vertical axis, wherein the second closer link and the closer link rotate about the same axis as the platform, and wherein the closer link is affixed to a first side of the platform and the second closer link is affixed to a second side of the platform.

8. The liftgate of claim 7, wherein the axis about which the platform is rotatable relative to the runner extends perpendicular to the frame and the second frame.

9. The liftgate of claim 7, wherein the first frame and the second frame are mounted to a vehicle, and wherein the axis perpendicular to the vertical axis is transverse across the vehicle.

10. The liftgate of claim 7, comprising a second linear actuator connected to a second end of the second slider to apply a force to the second slider, wherein the second linear actuator and the linear actuator are configured to operate simultaneously.

11. The liftgate of claim 1, wherein the platform includes a first segment and a second segment, the second segment configured to rotate relative to the first segment as the slider is translated along the vertical axis and rotates the first segment of the platform.

12. The liftgate of claim 11, wherein the first and second segments are oriented perpendicular to the frame when the platform is in a first orientation before the linear actuator is actuated, and the first and second segments are oriented parallel to the frame when the platform is in a second orientation after the linear actuator has been actuated.

* * * * *